(12) United States Patent
New et al.

(10) Patent No.: US 8,258,481 B2
(45) Date of Patent: Sep. 4, 2012

(54) SYSTEM AND METHOD FOR SELECTIVELY ENABLING OR DISABLING AN OPTICAL DEVICE

(75) Inventors: Tony New, Terre Haute, IN (US); Richard Selinfreund, Terre Haute, IN (US)

(73) Assignee: Sony DADC US Inc., Terre Haute, IN (US)

(*) Notice: Subject to any disclaimer, the term of this patent is extended or adjusted under 35 U.S.C. 154(b) by 1047 days.

(21) Appl. No.: 11/410,478

(22) Filed: Apr. 24, 2006

(65) Prior Publication Data

US 2006/0239155 A1      Oct. 26, 2006

Related U.S. Application Data

(60) Provisional application No. 60/674,948, filed on Apr. 25, 2005.

(51) Int. Cl.
*B32B 3/02* (2006.01)

(52) U.S. Cl. ........... 250/370.01; 250/336.1; 369/275.1; 369/284; 369/288

(58) Field of Classification Search ............... 250/336.1; 369/275.1
See application file for complete search history.

(56) References Cited

U.S. PATENT DOCUMENTS

| | | | |
|---|---|---|---|
| 5,173,381 A * | 12/1992 | Natansohn et al. | 430/19 |
| 5,436,885 A * | 7/1995 | Okumura et al. | 369/275.2 |
| 5,753,511 A | 5/1998 | Selinfreund | |
| 5,970,035 A | 10/1999 | Ohmori et al. | |
| 6,044,046 A * | 3/2000 | Diezmann et al. | 369/14 |
| 6,232,124 B1 | 5/2001 | Selinfreund | |
| 6,458,595 B1 | 10/2002 | Selinfreund | |
| 6,512,580 B1 | 1/2003 | Behringer et al. | |
| 6,589,626 B2 | 7/2003 | Selinfreund et al. | |
| 6,638,593 B2 | 10/2003 | Selinfreund et al. | |
| 6,707,539 B2 | 3/2004 | Selinfreund et al. | |
| 6,838,145 B2 | 1/2005 | Drew et al. | |
| 6,952,392 B2 | 10/2005 | Vig et al. | |

(Continued)

FOREIGN PATENT DOCUMENTS

JP      05-159365      6/1993

(Continued)

OTHER PUBLICATIONS

Flexplay Introduces 'ex-D' the 48-Hour DVD; http://electronics.howstuffworks.com/flexplay.htm; Aug. 6, 2005; 2 pages.

(Continued)

*Primary Examiner* — David Porta
*Assistant Examiner* — Djura Malevic
(74) *Attorney, Agent, or Firm* — Trellis IP Law Group, PC

(57) ABSTRACT

A system for selectively enabling or disabling an optical device. In an illustrative embodiment, the system implements an optical-device theft-prevention system. The theft-prevention system includes a material that is selectively positioned on, in, or relative to the optical device so that the transparency of the material affects a desired operation of the optical device. An energy beam is selectively employed to enable or disable the optical device by affecting the transparency of the material. In a specific embodiment, the fist material includes a dye, such as an energy-sensitive dye. The optical device includes an optical disc, such as Compact Disc (CD) or Digital Video Disc (DVD). The energy-sensitive dye is disposed over an entire readable surface of the optical device.

36 Claims, 5 Drawing Sheets

U.S. PATENT DOCUMENTS

| | | |
|---|---|---|
| 7,892,618 B2 * | 2/2011 | Eklund, II .................... 428/64.1 |
| 2002/0001690 A1 | 1/2002 | Selinfreund et al. |
| 2002/0031631 A1 | 3/2002 | Selinfreund et al. |
| 2002/0054566 A1 * | 5/2002 | Netsu et al. .................... 369/291 |
| 2002/0114265 A1 * | 8/2002 | Hart et al. ................... 369/275.5 |
| 2002/0197510 A1 | 12/2002 | Drew et al. |
| 2003/0047610 A1 | 3/2003 | Selinfreund et al. |
| 2003/0081521 A1 * | 5/2003 | Solomon et al. ........... 369/53.21 |
| 2003/0123050 A1 | 7/2003 | Selinfreund et al. |
| 2003/0147339 A1 | 8/2003 | Selinfreund et al. |
| 2003/0152019 A1 | 8/2003 | Thompson et al. |
| 2003/0219124 A1 | 11/2003 | Selinfreund et al. |
| 2004/0000787 A1 | 1/2004 | Vig et al. |
| 2004/0004922 A1 | 1/2004 | Selinfreund et al. |
| 2004/0110088 A1 | 6/2004 | Vig et al. |
| 2004/0115385 A1 | 6/2004 | Drew et al. |
| 2004/0118931 A1 | 6/2004 | Selinfreund et al. |
| 2004/0121262 A1 | 6/2004 | Selinfreund et al. |
| 2004/0152017 A1 | 8/2004 | Vig et al. |
| 2004/0236588 A1 | 11/2004 | Millard et al. |
| 2005/0050343 A1 | 3/2005 | Selinfreund et al. |
| 2005/0063256 A1 | 3/2005 | Selinfreund et al. |
| 2005/0083829 A1 | 4/2005 | Selinfreund et al. |
| 2005/0084645 A1 | 4/2005 | Selinfreund et al. |
| 2005/0107607 A1 | 5/2005 | Vig et al. |
| 2005/0153109 A1 | 7/2005 | Drew et al. |
| 2005/0153128 A1 | 7/2005 | Selinfreund et al. |
| 2005/0186382 A1 | 8/2005 | Vig et al. |
| 2006/0023600 A1 | 2/2006 | Selinfreund et al. |
| 2006/0078707 A1 | 4/2006 | Selinfreund |
| 2006/0114755 A1 | 6/2006 | Eklund |
| 2007/0050585 A1 * | 3/2007 | New et al. ..................... 711/163 |
| 2007/0170606 A1 * | 7/2007 | New ............................... 264/1.1 |
| 2008/0225424 A1 * | 9/2008 | New ............................... 359/893 |

FOREIGN PATENT DOCUMENTS

| | | |
|---|---|---|
| WO | 9941738 | 8/1998 |
| WO | WO0203386 | 1/2002 |
| WO | WO 03/087888 | 10/2003 |

OTHER PUBLICATIONS

Harris, Tom; How Flexplay DVDs Work; How Stuff Works; http://electronics.howstuffworks.com/flexplay.htm; 11 pages.

* cited by examiner

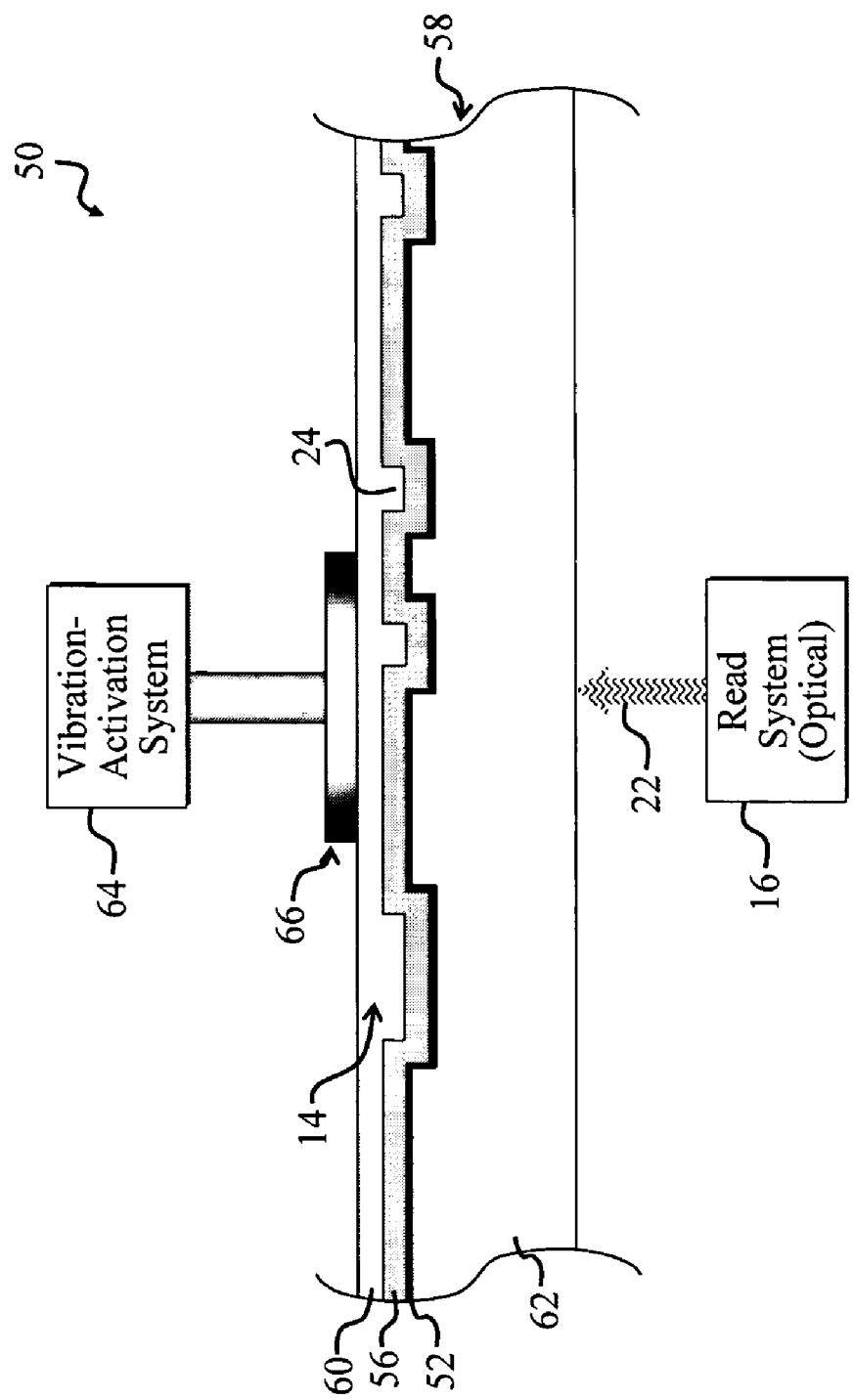

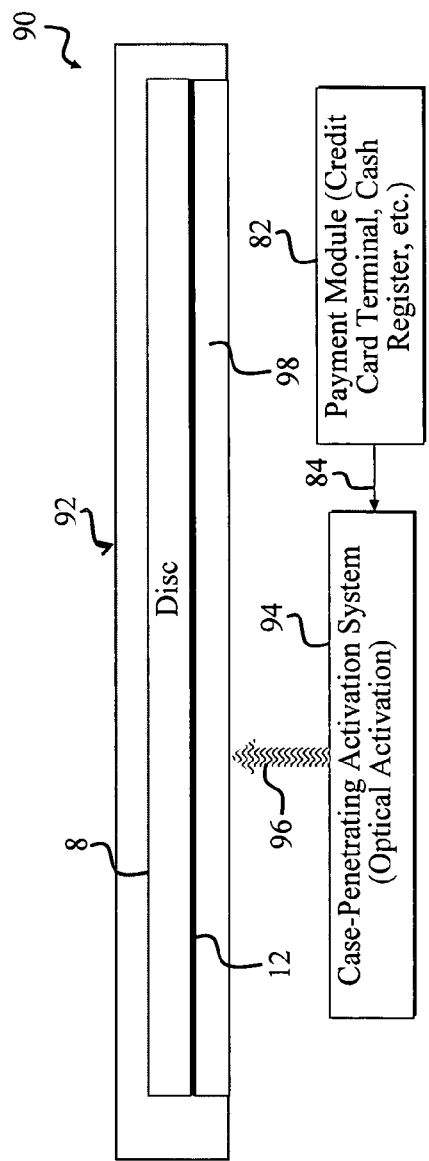
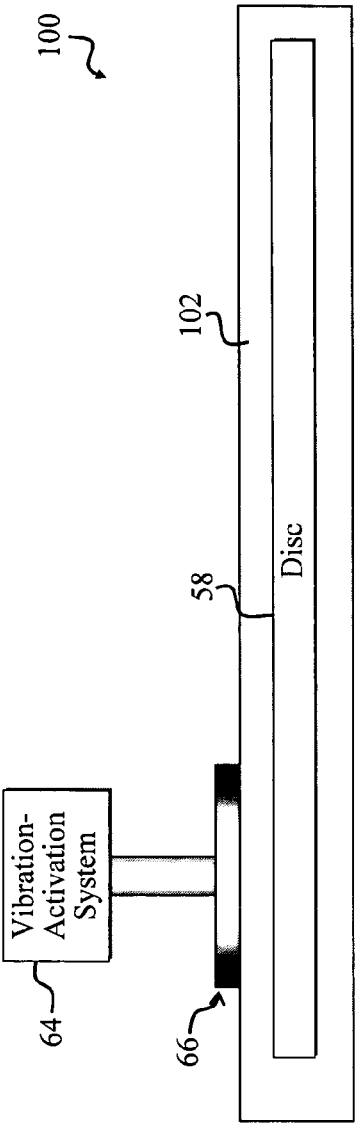

SYSTEM AND METHOD FOR SELECTIVELY ENABLING OR DISABLING AN OPTICAL DEVICE

CLAIM OF PRIORITY

This invention claims priority from U.S. Provisional Patent Application Ser. No. 60/674,948, entitled DEVICE TO PROTECT SUPPLY CHAIN INTEGRITY FOR OPTICAL BASED PRODUCTS, filed on Apr. 25, 2005, which is hereby incorporated by reference as if set forth in full in this application for all purposes.

BACKGROUND OF THE INVENTION

This invention is related in general to product-activation systems and methods and more specifically relates to systems and methods for selectively activating optical devices.

For the purposes of the present discussion, an optical device may be any device or medium that relies on optics to function properly. Examples of optical devices include, but are not limited to, Compact Discs (CDs), Digital Video Discs (DVDs), High Density DVDs (HD-DVDs), Blu-ray discs, and so on.

Systems and methods for selectively activating products are employed in various demanding applications including product theft-prevention, rental-return enforcement, and copyright infringement. Such applications often demand cost-effective systems that are difficult to circumvent, yet convenient to control with the appropriate equipment.

Systems for selectively activating products are particularly important in theft-prevention applications involving readily-shoplifted optical devices, such as CDs and DVDs. Conventionally, such optical devices are often tagged with a theft-prevention device, such as a sticker or a Radio Frequency Identification Tag (RFID) that is deactivated upon purchase. When deactivated, the devices prevent alarm-triggering tag functions from triggering alarms when a customer exits a merchandise outlet, such as a store.

Unfortunately, thieves may often readily notice and remove such tags. Furthermore, RFID tags may undesirably increase product costs and may further emit undesirable radio frequencies even after deactivation. For example, such frequencies may not be approved by the Federal Aviation Administration (FAA) for in-flight use.

BRIEF DESCRIPTION OF THE DRAWINGS

FIG. 3 shows an energy-sensitive dye that is applied over pits of an optical disc according to a second embodiment of the present invention.

FIG. 4 shows a first system for selectively activating an optical disc through a case according to a fourth embodiment of the present invention.

FIG. 5 shows a second system for selectively activating an optical disc through a case according to a fifth embodiment of the present invention.

SUMMARY OF EMBODIMENTS OF THE INVENTION

Figure 1:
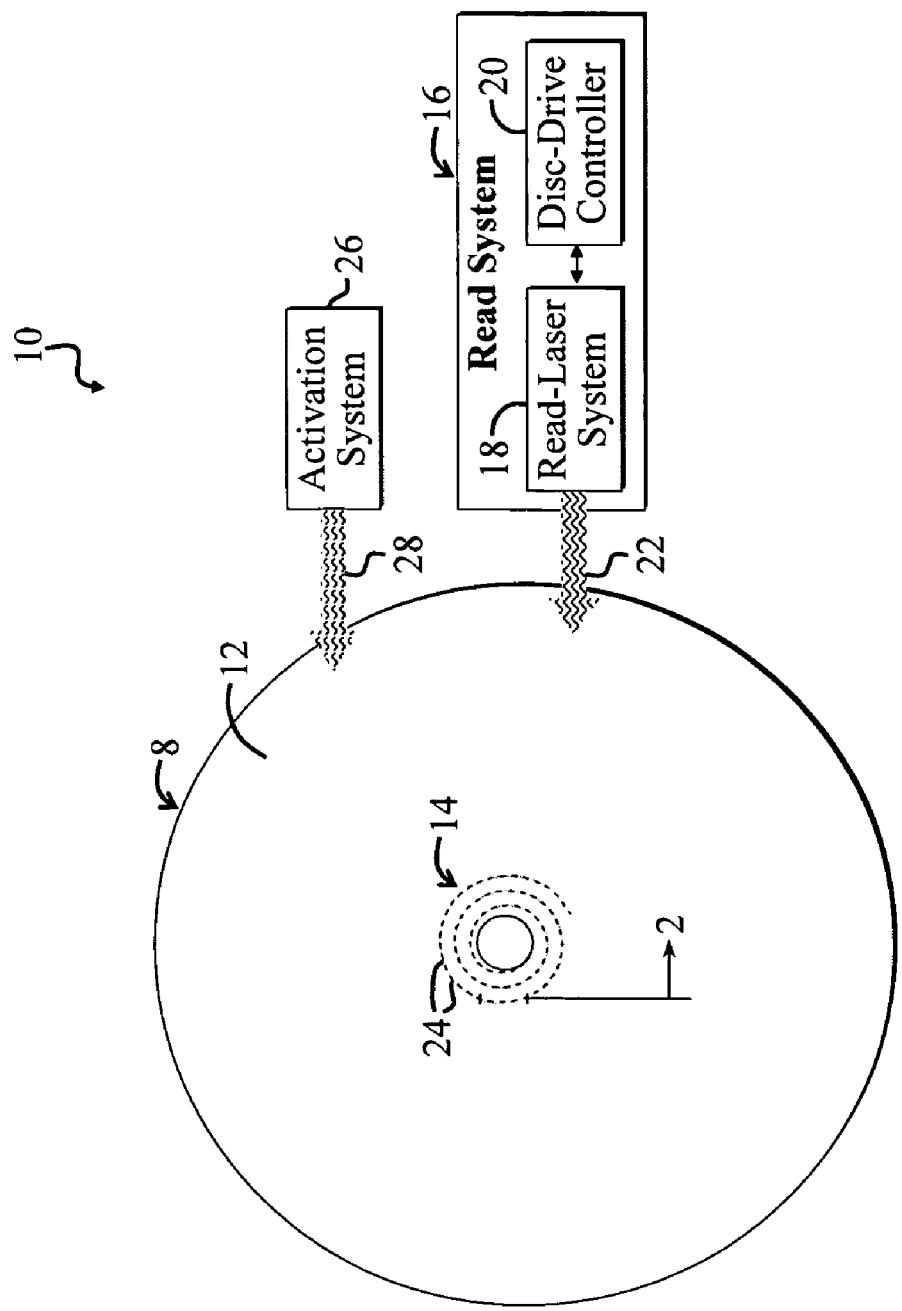
FIG. 1 shows an optical disc coated with special photosensitive ink that may be selectively activated according to a first embodiment of the present invention.

A preferred embodiment of the present invention implements a system for selectively enabling or disabling an optical device. In a specific implementation, the system is used as an optical-device theft-prevention system. The theft-prevention system includes a material that is selectively positioned on, in, or relative to the optical device so that the transparency of the material affects a desired operation of the optical device. An energy beam is selectively employed to enable or disable the optical device by affecting the transparency of the material.

In a more specific embodiment, the fist material includes a dye, such as an energy-sensitive dye. The optical device includes an optical disc, such as CD or DVD. The energy-sensitive dye is disposed over an entire readable surface of the optical device. A beam-producing device, such as a laser system, ultrasound system, or infrared transmitter, communicates with a controller. The controller adjusts the beam-producing device to produce a beam to selectively change transparency of the material.

The specific embodiment may be employed to enable optical devices when purchased. Consequently, stolen optical devices will not be operable until activated via special equipment, such as the beam-producing device and accompanying controller. Hence, certain embodiments of the present invention provide a cost-effective solution to inhibiting theft of optical devices.

DETAILED DESCRIPTION OF EMBODIMENTS OF THE INVENTION

For clarity, various well-known components, such as computers, power supplies, disc-manufacturing equipment, disc-drive motors, and so on, have been omitted from the figures. However, those skilled in the art with access to the present teachings will know which components to implement and how to implement them to meet the needs of a given application.

For the purposes of the present discussion photosensitive ink or dye may be any ink or dye that changes color or transparency in response to specific energy. An energy-sensitive ink or dye may be any ink or dye that changes nature, such as color or transparency, in response to application of energy, such as optical energy, vibrational energy, or acoustic energy. Optical energy may be any energy within a portion of the electromagnetic spectrum between and including ultraviolet and radio frequencies. In other embodiments energy other than optical energy may be employed to selectively change the transmissive properties of photosensitive ink.

An optical device may be any device or medium that employs optical energy to function as desired. An optical disc may be any optical device employed to store, provide, and/or manipulate data, such as in response to selective application of electromagnetic energy, such as optical energy. An optical disc may employ a beam of electromagnetic energy, such as optical energy, for reading and/or writing data to/from the optical disc. Examples of optical discs include, but are not limited to, Digital Video Discs (DVDs), Compact Discs (CDs), CD Recordable (CDR) media, CD Read/Write (CDRW) media, Blu-Ray discs, High-Density (HD) discs, optical memory cards, credit cards, Subscriber Identity Module (SIM) cards, and so on. A beam-producing device may be any device that can produce a beam of energy, such as a beam of ultrasound, infrared, or laser energy.

A theft-prevention system may be any apparatus, software, hardware, energy beam, instructions, or combination thereof capable of inhibiting theft or otherwise intended to reduce, inhibit, or prevent theft of any property.

FIG. 1 shows optical device 8 exhibiting photosensitive-ink-coated read surface 12 that may be selectively enabled according to first embodiment 10 of the present invention. Embodiment 10 implements system 10 for activating optical device 8 so that optical device 8 becomes readable and/or writeable. In the present specific embodiment, optical device 8 is an optical disc.

Optical device 8, which is not shown to scale, includes spiral track 14, which is strategically pitted to encode information that is readable by exemplary read system 16. Read system 16 includes read-laser system 18 in communication with drive controller 20. Drive controller 20 may include a control algorithm and an accompanying actuator for controlling read-laser system 18. Read-laser system 18 may include one or more optical pickups, a Digital-to-Analog Converters (DACs), amplifiers, and so on.

Read-laser system 18 produces laser beam 22, which reflects off of patterned pits 24 included in track 14. The pattern of reflected light may be employed by read system 16 or an accompanying computer to decode information encoded via the pits.

System 10 further includes activation system 26, which produces activating energy beam 28. Characteristics of activating energy beam 28 are selected in accordance with the type of ink or dye employed on photosensitive ink surface 12. For example, photosensitive ink surface 12 may only be bleached, i.e., made transparent, in response to a certain wavelength and/or intensity of light. Activation system 26 is adapted to produce activating energy beam 28 with the desired wavelength and/or intensity characteristics.

In operation, photosensitive ink surface 12 may exhibit a non-transparent state or a transparent state. By default, photosensitive ink surface 12 is initially non-transparent, causing optical device 18 to be deactivated or disabled so that it cannot readily be read or written to by read system 16 without activation.

In the non-transparent state, photosensitive ink surface 12 is sufficiently thick to block laser beam 22 output by read system 16, thereby preventing read system 16 from reading optical device 8. When photosensitive ink surface 12 is in a transparent state, laser beam 22 can sufficiently penetrate photosensitive ink surface 12 to enable read system 16 to read track 14. Read system 16 may be implemented via CD-ROM drive, DVD player, and so on.

In practice, activation system 26 employs activating energy beam 28 to selectively change the transparency of photosensitive ink surface 12 to activate optical device 8 as needed. A user may control activation system 26. Alternatively, activation system 26 is automatically controlled.

For example, a user may activate optical device 8 via activation system 26 upon purchase. Alternatively, activation system 26 may be automatically controlled by another device, such as a cash register, in response to payment for optical device 8 at a merchant outlet as discussed more fully below.

Activation system 26 directs activating energy beam 28 toward photosensitive ink surface 12, which turns transparent in response to activating energy beam 28.

Photosensitive ink surface 12 may be readily implemented via various types of ink, such azo ink, or ink made by Veriloc, Inc. without departing from the scope of the present invention. Other suitable inks include readily available CD-R and DVD-R recording dyes, including cyanine and phthalocyanine azo dyes, which are reactive to ultrasonic degradation in additional to optical degradation at specific wavelengths and intensities.

Ink surface 12 may be spin coated on entire readable surface 12 of optical disc 8. Accordingly, one or more well known manufacturing processes or sequences currently used to make optical discs may be readily adapted to spin coat photosensitive ink over ink surface 12. In such processes, an additional spin-coating device or other coating system may not be required, since the current equipment may be used for implementing embodiments of the present invention.

While the present embodiment employs photosensitive ink, other types of energy-sensitive ink may be employed instead of or in addition to photosensitive ink without departing from the scope of the present invention. For example, certain inks or dyes may respond to energy other than optical energy, such as vibrational energy, and/or ultrasound, as discussed more fully below.

Furthermore, while photosensitive ink surface 12 is discussed as being either non-transparent or transparent, other variations are possible, such as semi-non-transparent and sufficiently transparent to enable read system 16 to read optical disc 8.

Alternatively, ink surface 12 may be partially reflective or may exhibit a specific color that renders read-laser system 18 ineffective at reading track 14.

Figure 2:
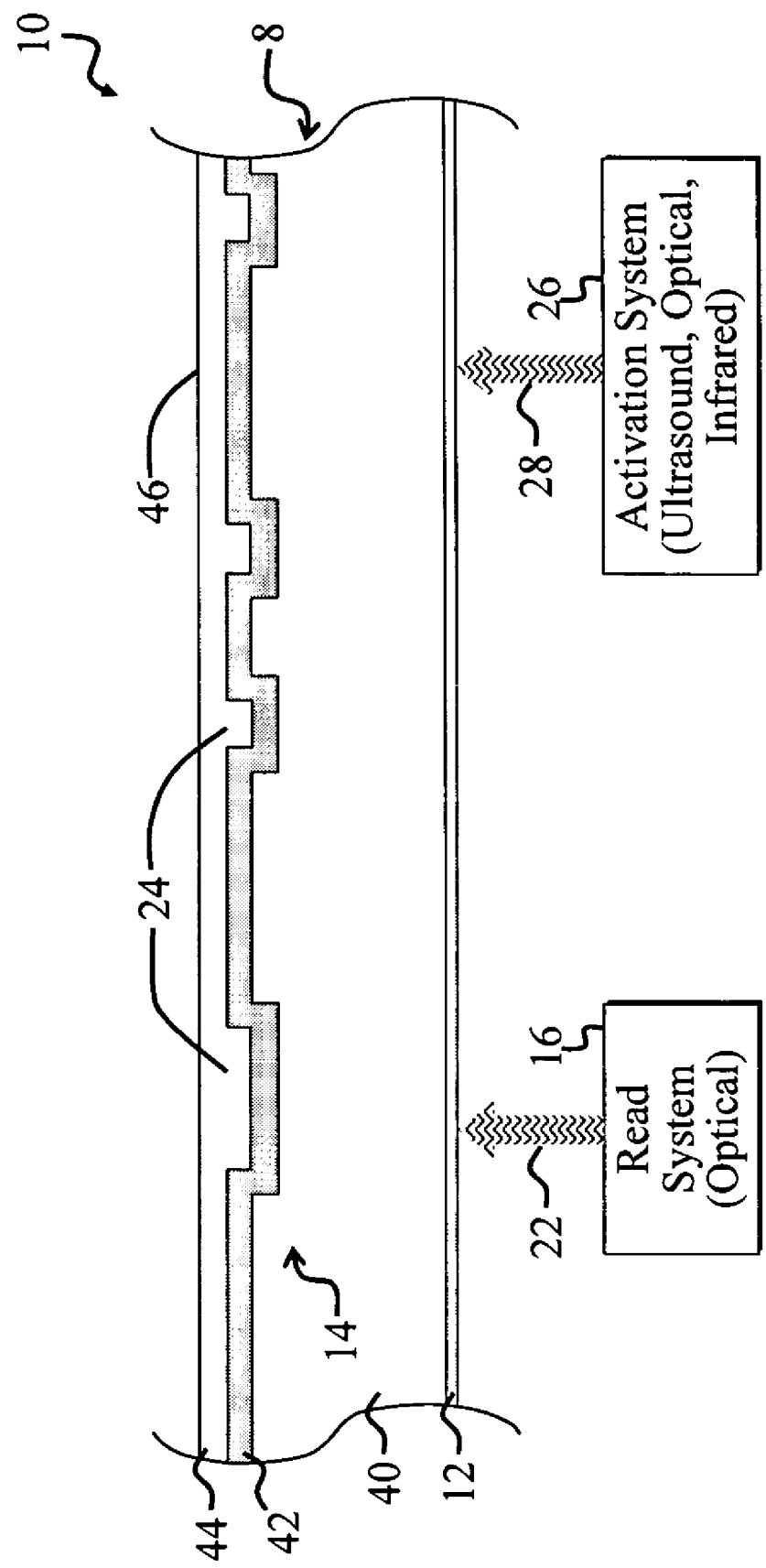
FIG. 2 shows a cross-section of the optical disc of FIG. 1.

FIG. 2 shows a cross-section of optical device 8 of FIG. 1. In the present specific embodiment, optical device 8 is a CD that includes photosensitive dye surface 12 covering a substantially transparent polycarbonate layer 40. Polycarbonate layer 40 conforms to strategically pitted reflective aluminum layer 42 that is positioned opposite to photosensitive dye surface 12. Aluminum layer 42 includes the information-encoded pits 24 of track 14.

Acrylic layer 44 is disposed on aluminum layer 42 opposite polycarbonate layer 40. Opposite surface 46 of acrylic layer 44 may accommodate a disc label.

Hence, photosensitive dye surface 12 is positioned to block or interfere with read laser beam 22 when optical device 8 is disabled, and to allow read laser beam 22 to read track 14 when optical device 10 is enabled. Activation system 26 is positioned to employ activating beam 28 to selectively enable optical device 8 by causing dye surface 12 to become sufficiently transparent to allow reading of track 14 by read system 16.

Beam 28 may be an ultrasonic beam, an infrared beam, or another type of energy beam that may cause photosensitive layer 12 to change from non-transparent to substantially transparent. While photosensitive layer 12 is called photosensitive, it may be sensitive to other types of energy, such as ultrasound at specific wavelengths (e.g. 300 Hz) and amplitudes, without departing from the scope of the present invention.

Use of ultrasound to degrade or bleach azo dyes, such as photosensitive dyes currently employed in CD-Recordable media, is known in the art. Accordingly, one skilled in the art may readily employ azo dyes to implement various embodiments of the present invention without undue experimentation.

While present embodiment 10 is shown including single-sided optical disc 8, other types of optical discs, such as double-sided discs, may be employed without departing from the scope of the present invention.

In a preferred embodiment, photosensitive layer 12 comprises a coating of ink or dye that can be activated by energy quanta. This coating is spin coated on polycarbonate layer 40. Preexisting coating stations in a disc-manufacturing line may be employed to perform coating of the ink or dye to form photosensitive layer 12. Accordingly, many standard disc-manufacturing processes may be readily adapted to implement embodiments of the present invention.

FIG. 3 shows energy-sensitive dye 52 that is applied over pits 24 in reflective aluminum layer 56 of optical disc 58 according to second embodiment 50 of the present invention.

In the present specific embodiment, aluminum layer 56 is positioned between acrylic layer 60 and energy-sensitive dye 52. Energy-sensitive dye 52 is positioned between bottom polycarbonate layer 62 and aluminum layer 56. Energy-sensitive dye layer 52, like photosensitive layers, may be spin coated without incurring significant additional cost. System 50 further includes vibration-activation system 64 in communication with vibration actuator 66, which is positioned adjacent to alternative optical disc 58.

In operation, the transparency of energy-sensitive layer 52 changes from non-transparent to substantially transparent in response to vibration at a specific frequency and/or intensity of vibration. Vibration-activation system 64 controls vibration actuator 66, which may at the necessary vibration frequency and/or vibration amplitude or intensity to cause the transparency of energy-sensitive layer 56 to change as desired. For example, to activate or enable optical disc 58, vibration-activation system 64 employs vibration actuator 66 to cause optical disc 58 to vibrate sufficiently to cause energy-sensitive layer 52 to become transparent.

Use of vibrational energy to cause chemical energy changes is known in the art. One skilled in the art with access to the present teachings may readily select or purchase an appropriate energy-sensitive material that is responsive to specific frequencies and/or amplitudes of vibrational energy without undue experimentation.

With reference to FIGS. 1-3, various manufacturing techniques may be employed to implement various embodiments of the present invention. In FIG. 3, energy-sensitive coating or layer 52 may be placed over polycarbonate layer 62 after the polycarbonate layer 62 is molded to conform to pits 24 and before aluminum layer 56 is diffused or otherwise dispersed over polycarbonate layer 62 in preparation for bonding to acrylic layer 60. This cost-effective manufacturing method may result in fast ink-activation times and reliability.

FIG. 4 shows first system 90 for selectively activating optical disc 8 through case 92, such as an Amaray case, according to a fourth embodiment of the present invention. In the present specific embodiment, system 90 includes case-penetrating activation system 94 for producing case-penetrating beam 96, such as a beam of infrared energy or a laser beam of a predetermined wavelength sufficient to change the transparency of an accompanying photosensitive-ink-coated read surface 12 on the optical disc 8.

With reference to FIGS. 1 and 2, the transparency of ink-coated surface 12 is responsive to case-penetrating beam 96. For illustrative purposes, case 92 includes optional optically transparent side 98, which may provide a path through which energy, such as case-penetrating beam 96 may pass.

System 90 further includes payment module 82 in communication with case-penetrating activation system 94. Payment module 82 may be implemented via a cash register, a credit-card terminal, a computer, or other device that outputs signal 84 in response to payment for the purchase of optical disc 8.

In operation, activation system 94 transmits case-penetrating beam 96 toward transparent side 98 of case 92 in response to signal 84. Transparent side 98 may correspond to side of case 92 through which the case-penetrating beam 96 may readily pass to activate disc 8. Transparent side 98 may be a side of case 92 that is not blocked by a paper insert, i.e., side of case 92 may coincide with an opening, such as a circular cutout, in a paper case insert.

Case-penetrating beam 96 causes ink-coated read surface 12 to become sufficiently clear, i.e., to transition from a non-transparent state to a substantially transparent state, to enable reading of the disc 8 via an optical read system.

FIG. 5 shows second system 100 for selectively activating optical disc 58 of FIG. 3 through case 102 according to a fifth embodiment of the present invention. System 100 includes vibration-activation system 64 and accompanying vibration actuator 66 of FIG. 3.

Figure 6:
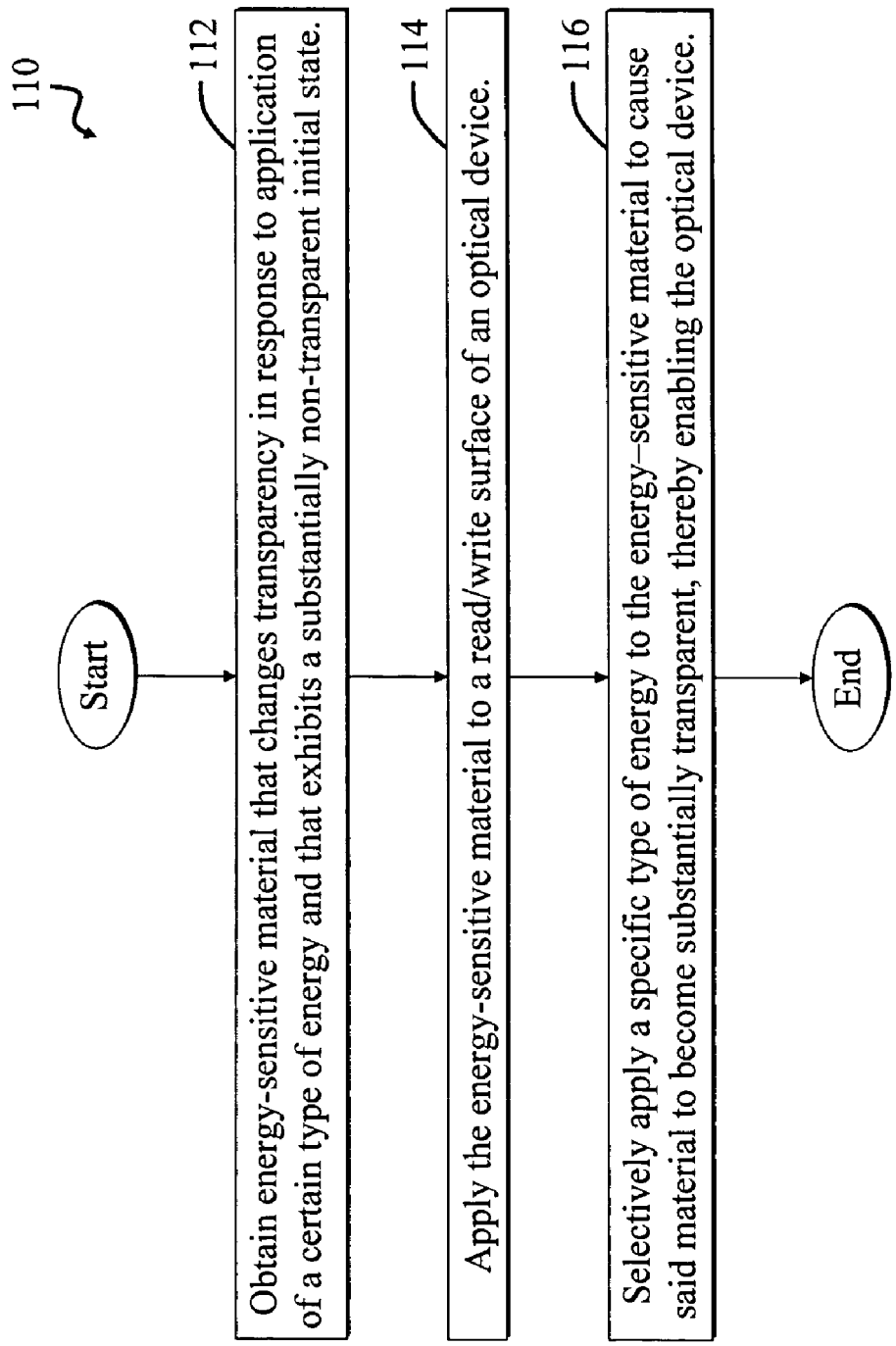
FIG. 6 shows a flow diagram of a method adapted for use with the embodiments of FIGS. 1-6.

Vibration actuator 66 is affixed to case 102 containing disc 58. With reference to FIGS. 3 and 6, case 102 and accompanying disc 58 vibrate sufficiently to activate disc 58 upon activation of vibration-activation system 64.

Various types of dyes may be employed to implement embodiments of the present invention. Exemplary dies include various types of recording dyes used for Write Once Read Many (WORM) discs, and so on. Such dyes are relatively inexpensive and have characteristics that are suitable for use with embodiments of the present invention. The dye could be made of a very inexpensive material and placed onto or into optical media during production of an optical device.

Infrared and/or ultra sound equipment sufficient to bleach a dye that is spin coated on an optical device is readily deployable in merchant checkout devices. Various embodiments of the present invention may induce optical changes in the dyes to implement various features, including, but not limited to, security and authentication features for supply-chain management, selective activation of a subset of available features of an optical device, and so on.

Hence, certain embodiments of the present invention may be employed with various types of activation energy, such as vibration or ultrasound at specific frequencies. The preferred embodiment employs dye that may be activated at a specific frequency or frequency range or at multiple frequencies or frequency ranges of energy. The exact activation frequencies may be difficult for a thief to determine.

Various pits 24 of FIGS. 1-4 may be engineered as unique structures that work in the presence of non-transparent dye to implement additional device-activation functionality. Selective activation of unique pits 24 may transition a disc from an error state to a valid state, thereby enabling the disc, i.e., making the disc readable and/or writeable by a player and/or recorder designed for the disc.

Depending upon the dye selected for embodiments of the present invention, light activation may be permanent and non-reversible. In certain applications, non-reversible inks are preferred, whereas in other applications, such as rental applications, reversible inks are preferred.

Exact methods for activating the dyes, i.e., making the dyes transparent, are generally application-specific. Activation may be implemented via an external source, such as an external light source, such as vibration system 64 of FIG. 5. Generally, desired ink-activation times are also application specific. However, generally applications employ activation times of less than one minute.

Various embodiments of the present invention may provide important capabilities and features for merchants of various optical products, such as CDs and DVDs. Such capabilities and features include simple and reliable one-time activation at the point of sale; exposure to twenty four hours of direct sunlight will not activate the optical device; activation time of less than one minute; simultaneous activation of plural optical devices, such as stacked or layered discs; activation through product packaging, including product cases; difficult to reverse engineer the activation system; may be cost effectively implemented; and may not degrade the long term performance of the accompanying optical device.

Those skilled in the art may construct inks and associated ultrasound equipment to selectively alter the chemistry of the inks to affect ink transparency without undue experimentation. Conventional systems for inducing changes in material chemistry may be adapted for use with embodiments of the present invention without departing from the scope thereof.

FIG. 6 shows a flow diagram of method 110 adapted for use with the embodiments of FIGS. 1-6. Method 110 includes initial material-obtaining step 112, which involves obtaining energy-sensitive material, such as azo dye, which changes transparency in response to the application of a certain type of energy, such as a specific frequency and amplitude of optical energy. In the present specific embodiment, the energy-sensitive material exhibits an initial non-transparent state. The material can included any suitable ink, dye, or other material with modifiable optically transmissive properties.

Subsequent applying step 114 includes applying the energy-sensitive material to a surface or layer of an optical device, such as a read/write surface, through which light must pass to enable effective operation of the optical device. The energy-sensitive material is applied in thick enough layers and/or in sufficient concentrations to disable operation of the device.

In subsequent selective-activating step 116, the optical device is activated as needed by applying sufficient energy to the energy-sensitive material to cause a state change from non-transparent to sufficiently transparent to enable the optical device to function as desired. Subsequently, method 110 completes.

Various steps of method 110 may be omitted, replaced, or altered without departing from the scope of the present invention. For example, the energy-sensitive material obtained in material-obtaining step 112 may exhibit an initial transparent state, and activating step 116 may be replaced with an analogous deactivating step.

While embodiments herein are discussed primarily with respect to one-time activation of an optical disc at a point of sale to prevent or thwart theft of the optical device, the invention is not limited thereto. For example, different materials or combinations thereof may be employed to enable multiple state changes for a given energy-sensitive layer, thereby allowing multiple activations and deactivations of an optical device. Multiple activations and deactivations may be particularly important in rental applications, such as movie rentals, where optical devices may need repeated activation and deactivation.

Although embodiments of the invention are discussed primarily with respect to systems and methods for inhibiting theft of an optical device by selectively enabling the optical device after purchase, other uses and features are possible. Various embodiments discussed herein are merely illustrative, and not restrictive, of the invention. For example, energy-sensitive inks in accordance with the present teachings may be employed to thwart copyright infringement.

Although a process of the present invention may be presented as a single entity, such as software executing on a single machine, such as payment module 82 of FIG. 4 or disc-drive controller 20 of FIG. 1, such software can readily be executed on multiple machines. That is, there may be multiple instances of a given software program, a single program may be executing on two or more processors in a distributed processing environment, parts of a single program may be executing on different physical machines, etc.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, Field of the Invention, Title, or Summary, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system for selectively enabling an optical medium, the system comprising:
   a material applied to at least a portion of the medium to prevent reading of the medium by a read-laser beam; and
   an energy source having an energy type that is different from the read-laser beam, wherein the energy source changes the state of the material to permanently permit reading of the optical medium by the read-laser beam even in the absence of the energy source.

2. The system of claim 1, wherein said energy source includes vibrational energy.

3. The system of claim 1, wherein said energy source includes a beam of energy.

4. The system of claim 3, further including:
   a beam-producing device.

5. The system of claim 4, further including:
   a controller in communication with the beam-producing device, wherein the controller is capable of controlling the first beam-producing device to selectively change transparency of the material.

6. The system of claim 4, wherein the beam-producing device is adapted to output ultrasound.

7. The system of claim 4, wherein the beam-producing device is adapted to output infrared energy.

8. The system of claim 1, wherein said energy source includes optical energy.

9. The system of claim 1, wherein said energy source includes ultrasonic energy.

10. The system of claim 1, wherein the material includes a dye.

11. The system of claim 6, wherein the dye includes a photosensitive dye.

12. The system of claim 10, wherein the medium includes an optical disc.

13. The system of claim 12, wherein the dye is disposed over an entire readable surface of the optical disc.

14. The system of claim 1, wherein the energy type includes a frequency of a laser beam.

15. The system of claim 1, wherein the energy type includes an intensity of a laser beam.

16. An optical disc having data and including a mechanism for inhibiting theft, the optical disc comprising:
   a polycarbonate layer;
   a reflective layer positioned on the polycarbonate layer, wherein the reflective layer includes pits in a pattern representing the data so that a read-laser beam can read the data by detecting reflections and non-reflections from the reflective layer; and
   a material positioned on the disc for blocking the read-laser beam from reading the data on the optical disc, wherein the material is responsive to a one-time activation by an energy source at a point of sale location to permanently permit reading of the optical disc at a location other than the point of sale location by a read-laser beam even in the absence of the energy source.

17. The system of claim 16, wherein the optical disc includes a digital versatile disc (DVD).

18. The system of claim 16, wherein the desired function includes:
   enabling reading or writing of the optical disc via a laser.

19. The system of claim 16, wherein the optical disc includes a compact disc (CD).

20. A system for inhibiting theft of an optical device, the system comprising:
   a material having first and second states, wherein the material is selectively positioned on the optical device so that a state of the material affects the ability of a read-laser beam to read data from the optical device; and
   a mechanism for selectively controlling the state of the material so that functions of the optical device are substantially disabled when the material is in the first state and are thereafter permanently enabled when the material is placed in the second state by an energy source having a different energy type than an energy type of the read-laser beam.

21. The system of claim 20, wherein the first state and the second state include states of transparency.

22. The system of claim 21, wherein the first state includes a non-transparent state.

23. The system of claim 22, wherein the second state includes a transparent state.

24. The system of claim 21, wherein the material includes a material that changes transparency in response to selective application of energy.

25. The system of claim 24, wherein the mechanism includes a device capable of selectively applying the energy to control the transparency as desired.

26. The system of claim 25, wherein the energy includes infrared energy.

27. The system of claim 25, wherein the energy includes ultrasonic energy.

28. The system of claim 25, wherein the energy includes vibrational energy.

29. The system of claim 25, wherein the material includes azo dye.

30. A system for selectively affecting the operation of an optical device, the system comprising:
   a material having a controllable transparency, wherein the material is selectively positioned on the optical device so that transparency of the material prevents reading of the optical device by a read-laser beam; and
   an energy source capable of enabling or disabling the optical device by affecting the transparency of the material to permanently permit reading of the optical device by the read-laser beam even in the absence of the energy source.

31. A system for selectively affecting the operation of an optical disc, the system comprising:
   a material exhibiting an initially non-transparent state to prevent reading of the optical disc, wherein the material substantially covers one side of the optical disc; and
   first means for selectively enabling the desired functions of the optical disc by affecting the transparency of the material, to permanently permit reading of the optical disc even in the absence of the first means.

32. The system of claim 31, wherein the first means includes a beam of energy.

33. A system for inhibiting theft of a product, the system comprising:
- a material bonded to or integrated in said optical device, wherein said material is intended to remain bonded to or integrated in said optical device during device operation; and
- first means for selectively changing a characteristic of said material so that said product transitions from being inoperable to operable upon application of said first means to permanently permit reading of the product even in the absence of the first means.

34. The system of claim 33, wherein said first means includes a beam of energy.

35. The system of claim 34, wherein said material includes an ink or dye that changes transitions from being non-transparent to being transparent upon application of said beam of energy.

36. The system of claim 35, wherein said product includes an optical disc.

* * * * *